US012240208B2

(12) United States Patent
Van Trump et al.

(10) Patent No.: US 12,240,208 B2
(45) Date of Patent: Mar. 4, 2025

(54) BIOPOLYMER COATED FIBER FOOD SERVICE ITEMS

(71) Applicant: Danimer IPCo, LLC, Bainbridge, GA (US)

(72) Inventors: Phillip Van Trump, Decatur, GA (US); John Moore, Gainesville, GA (US); Joe B. Grubbs, III, Bishop, GA (US); Karson Durie, Athens, GA (US)

(73) Assignee: Danimer IPCo, LLC, Bainbridge, GA (US)

( * ) Notice: Subject to any disclaimer, the term of this patent is extended or adjusted under 35 U.S.C. 154(b) by 349 days.

(21) Appl. No.: 16/601,621

(22) Filed: Oct. 15, 2019

(65) Prior Publication Data
US 2020/0114625 A1 Apr. 16, 2020

Related U.S. Application Data

(60) Provisional application No. 62/745,500, filed on Oct. 15, 2018.

(51) Int. Cl.
| B32B 23/04 | (2006.01) |
| A47G 19/00 | (2006.01) |
| A47G 19/02 | (2006.01) |
| A47G 19/03 | (2006.01) |
| A47G 19/12 | (2006.01) |
| A47G 19/22 | (2006.01) |
| A47G 21/00 | (2006.01) |
| B32B 5/18 | (2006.01) |
| B65D 65/46 | (2006.01) |
| C08G 63/06 | (2006.01) |
| C08L 1/02 | (2006.01) |
| C08L 67/04 | (2006.01) |
| C09D 167/04 | (2006.01) |

(52) U.S. Cl.
CPC ............ *B32B 23/048* (2013.01); *A47G 21/00* (2013.01); *B32B 5/18* (2013.01); *B65D 65/466* (2013.01); *C08G 63/06* (2013.01); *A47G 19/00* (2013.01); *A47G 19/02* (2013.01); *A47G 19/03* (2013.01); *A47G 19/12* (2013.01); *A47G 19/22* (2013.01); *A47G 2400/10* (2013.01); *B32B 2307/7163* (2013.01); *B32B 2439/70* (2013.01); *C08L 1/02* (2013.01); *C08L 67/04* (2013.01); *C09D 167/04* (2013.01)

(58) Field of Classification Search
None
See application file for complete search history.

(56) References Cited

U.S. PATENT DOCUMENTS

| 5,096,650 | A | * | 3/1992 | Renna | B31F 1/0077 162/227 |
| 5,350,627 | A | * | 9/1994 | Nemphos | D04H 1/587 428/913 |
| 5,451,456 | A | * | 9/1995 | Marchessault | C08J 5/18 428/533 |
| 5,508,072 | A | * | 4/1996 | Andersen | B29C 43/24 524/498 |
| 5,618,387 | A | * | 4/1997 | Yeh | D21H 21/24 162/224 |
| 5,827,612 | A | * | 10/1998 | Girgis | C03C 25/285 427/407.1 |
| 5,906,894 | A | * | 5/1999 | West | D21H 27/38 428/536 |
| 6,180,037 | B1 | * | 1/2001 | Andersen | B29C 51/002 264/108 |
| 7,491,754 | B2 | * | 2/2009 | Senda | C08J 3/05 523/124 |
| 2003/0217648 | A1 | | 11/2003 | Noda et al. | |
| 2004/0105941 | A1 | * | 6/2004 | Terada | D21H 19/18 428/34.2 |
| 2004/0225269 | A1 | * | 11/2004 | Zhao | B29B 7/88 264/479 |
| 2005/0031882 | A1 | * | 2/2005 | Noda | D06M 15/507 428/511 |
| 2006/0147695 | A1 | * | 7/2006 | Serizawa | C08L 101/16 428/297.4 |
| 2006/0191655 | A1 | * | 8/2006 | Nunn | D04H 1/732 162/146 |
| 2006/0240726 | A1 | * | 10/2006 | Hodson | B32B 27/10 442/59 |
| 2009/0018235 | A1 | * | 1/2009 | Nascimento | C08L 67/04 524/400 |

(Continued)

FOREIGN PATENT DOCUMENTS

| EP | 1418272 A1 | 5/2004 |
| EP | 1566409 A1 | 8/2005 |

(Continued)

OTHER PUBLICATIONS

Songhan—Styron DL 455 SB Latex (undated).*
Translation of Office Action, Patent Application 2021-520914, Dated Sep. 20, 2023, Japan.
Japanese Patent Office, Moisture Absorbing-Oil Resistant Paperboard; Translation of Prior Art Reference, Publication JP 2009-013506 A, date of publication Jan. 22, 2009.
Japanese Patent Office; Office Action, Patent Application 2021-520914, Dated Sep. 20, 2023, Japan.
Machine Translation of JP H04334448 (1992).

*Primary Examiner* — Vivian Chen
(74) *Attorney, Agent, or Firm* — Luedeka Neely, P.C.

(57) ABSTRACT

A biodegradable food service item is disclosed, which includes a biodegradable substrate having at least one food contact surface. This substrate is made of cellulosic fibers. The food service item also includes a coating applied over the at least one food contact surface. This coating is made up of from about 25 to about 60 weight percent of at least one biodegradable polymer, such as polyhydroxyalkanoates. A method for making the biodegradable food service item is also disclosed.

14 Claims, No Drawings

(56) References Cited

U.S. PATENT DOCUMENTS

| | | | |
|---|---|---|---|
| 2010/0044267 A1* | 2/2010 | Tolibas-Spurlock | ..................... B65D 65/466 156/245 |
| 2010/0048767 A1* | 2/2010 | Nascimento | ............ C08L 67/04 524/502 |
| 2010/0181372 A1 | 7/2010 | Huang | |
| 2011/0213056 A1* | 9/2011 | Hasty | ................. C08L 67/02 528/302 |
| 2011/0251349 A1* | 10/2011 | Padwa | ................. C08G 63/912 525/190 |
| 2012/0007267 A1* | 1/2012 | Pawloski | ................... B29B 9/06 264/55 |
| 2018/0171559 A1* | 6/2018 | Hipps, Sr. | ............... D21H 19/34 |
| 2020/0048493 A1* | 2/2020 | Grubbs, III | ............... C09D 7/65 |
| 2021/0017714 A1* | 1/2021 | Mongrain | ............ D21H 19/824 |
| 2022/0025174 A1* | 1/2022 | Vodovotz | ................ C08L 67/04 |

FOREIGN PATENT DOCUMENTS

| | | | |
|---|---|---|---|
| JP | H04334448 A | | 11/1992 |
| JP | H11500613 A | | 1/1999 |
| JP | 2001146523 A | | 5/2001 |
| JP | 2002-121288 A | * | 4/2002 |
| JP | 2003-013391 A | * | 1/2003 |
| JP | 2005350530 A | | 12/2005 |
| JP | 2006136657 A | | 6/2006 |
| JP | 2009013506 A | | 1/2009 |
| WO | 9600263 A1 | | 1/1996 |
| WO | 9624682 A1 | | 8/1996 |
| WO | 0194697 A2 | | 12/2001 |
| WO | 2010151798 A2 | | 12/2010 |
| WO | WO 2011/087438 A | * | 7/2011 |
| WO | 2013007872 A1 | | 1/2013 |
| WO | 2014023319 A1 | | 2/2014 |
| WO | 2017087658 A1 | | 5/2017 |
| WO | 2018038669 A1 | | 3/2018 |
| WO | 2018067006 A1 | | 4/2018 |

\* cited by examiner

BIOPOLYMER COATED FIBER FOOD SERVICE ITEMS

FIELD

This disclosure relates to biodegradable polymeric compositions. More particularly, this disclosure relates to disposable food service items having a biodegradable polymeric coating.

BACKGROUND

For the sake of convenience, consumers frequently use disposable food service items, such as plates, bowls, cups, takeout containers, straws and eating or drinking utensils. Disposable food service items are particularly convenient for serving food at large gatherings of people and at outdoor dining events.

Disposable food service items may readily be fabricated from substrates such as paperboard which decompose relatively quickly after landfill disposal. However, a simple, uncoated paperboard substrate generally performs poorly as a food service item because the paperboard will rapidly soak up water and/or grease, which ultimately compromises the strength of the paperboard. As a result, food service items made from paperboard are typically coated with a thin polymer layer to improve water and grease resistance.

Coating made from polymers such as polyethylene (PE), polypropylene (PP), or polyethylene terephthalate (PET) may significantly improve the resistance of the paperboard to water and/or grease absorption; however, such polymers do not readily degrade or decompose after landfill disposal. Thus, the paperboard items coated with such polymers may subsist in landfills for centuries after disposal.

It would be desirable to provide a new coating for food service items which is fully biodegradable, especially if this biodegradable coating provided good water and grease resistance—i.e. water and grease resistance comparable to that provided by conventional, nonbiodegradable coatings.

SUMMARY OF THE INVENTION

The above and other needs are met by a biodegradable food service item according to the present disclosure. According to one embodiment, this biodegradable food service item includes a biodegradable substrate having at least one food contact surface. This substrate is made of cellulosic fibers. The food service item also includes a typically aqueous coating applied over the at least one food contact surface. The coating, prior to curing or drying, is made up of from about 25 to about 60 weight percent of at least one biodegradable polymer and typically from about 40 to about 75 weight percent water.

In certain embodiments, the at least one biodegradable polymer is preferably selected from the group consisting of polyhydroxyalkanoates, polylactic acid, polycaprolactone, polybutylene succinate, polybutylene succinate adipate, polybutylene adipate terephthalate, and mixtures thereof.

According to some embodiments, the at least one biodegradable polymer preferably includes polyhydroxyalkanoates. In accordance with certain embodiments of the present disclosure, the polyhydroxyalkanoates more preferably have a weight average molecular weight from about 50,000 to about 2.5 million Daltons.

In certain embodiments, the biodegradable substrate is preferably a biodegradable plate, cup, bowl, takeout container, straw, or eating utensil.

In certain embodiments, the biodegradable substrate preferably also includes about 25 to about 60 weight percent of the at least one biodegradable polymer, from about 0.1 to about 2.0 weight percent of a surfactant (such as a wetting and dispersing agent), from about 0.1 to about 2.0 weight percent of a rheology modifier, and from about 0.001 to about 2.0 weight percent of a biocide dispersed within the substrate.

In certain embodiments, at least a portion of the cellulosic fibers are preferably derived from sugarcane, bagasse, wheatgrass, or recycled wood pulp.

In accordance with certain embodiments of the present disclosure, the coating is preferably applied over the at least one food contact surface at a coat weight, on a dry basis, from about 5 to about 50 grams per square meter.

According to some embodiments, the coating preferably exhibits a Cobb water absorption value, measured according to TAPPI Standard T441, of less than 25 grams per square meter. Further, in certain embodiments, the coating preferably exhibits a Kit Test grease resistance value, measured according to TAPPI Standard T559 cm-12, of greater than Kit Value 5.

In a second aspect, the present disclosure provides a method for making a biodegradable food service item. According to one embodiment, this method includes a step of providing a biodegradable aqueous dispersion which is made up from water, from about 25 weight percent to about 60 weight percent (or in some embodiments from about 40 weight percent to about 75 weight percent) of at least one biodegradable polymer, from about 0.1 to about 2.0 weight percent of a surfactant, from about 0.1 to about 2.0 weight percent of a rheology modifier, optionally from about 0.1 to about 1.0 weight percent of a defoamer, optionally from about 1 to about 20% of a filler, and from about 0.001 to about 2.0 weight percent of at least one biocide.

According to the method, a layer of an aqueous slurry is formed over a mold. This aqueous slurry includes water and from about 10 to about 70 weight percent cellulosic fibers. The aqueous slurry is then molded, using a combination of heat and pressure. According to the method, the heat and pressure from this molding step at least partially dries the slurry to form a biodegradable substrate.

An amount of the biodegradable aqueous dispersion is also applied over the substrate to form a layer of the dispersion over a first surface of the substrate. This dispersion layer is then cured so as to form a film coating over the first surface of the biodegradable substrate.

According to some embodiments of the method, the aqueous slurry preferably also includes from about 10 to about 70 weight percent of the biodegradable aqueous dispersion.

In accordance with certain embodiments of the method, the aqueous dispersion is preferably spray coated over at least one surface of the molded slurry layer.

In certain embodiments of the method, the slurry is preferably molded at a temperature from about 85° C. to about 170° C. and a pressure from about 100 psi to about 1500 psi. In other preferred embodiments, the pressure is from about 1000 psi to about 100,000 psi.

According to some embodiments of the method, the slurry preferably has a solids content from about 10 to about 85 weight percent when initially formed over the mold.

In certain embodiments of the method, the aqueous dispersion preferably has a solids content from about 25 to about 60 weight percent, more preferably from about 25 to about 55 weight percent, when applied over the slurry layer In accordance with certain embodiments of the method, the at least one biodegradable polymer is preferably selected from the group consisting of polyhydroxyalkanoates, polylactic acid, polycaprolactone, polybutylene succinate, polybutylene succinate adipate, polybutylene adipate terephthalate, and mixtures thereof.

In certain embodiments of the method, the at least one biodegradable polymer preferably includes polyhydroxyalkanoates. According to some embodiments of the method, the polyhydroxyalkanoates more preferably have a weight average molecular weight from about 50,000 to about 2.5 million Daltons.

DETAILED DESCRIPTION

In a first aspect, the present disclosure provides a biodegradable food service item. For instance, the biodegradable food service item may be formed as a biodegradable plate, cup, bowl, takeout container, straw or eating utensil.

In general, the biodegradable food service item includes a biodegradable substrate having at least one food contact surface, and a coating applied over the at least one food contact surface.

As used herein, the term "biodegradable" refers to a plastic or polymeric material coating that will undergo biodegradation by a living organism (microbes) in anaerobic and aerobic environments (as determined by ASTM D5511), in soil environments (as determined by ASTM 5988), in freshwater environments (as determined by ASTM D5271 (EN 29408)), or in marine environments (as determined by ASTM D6691). The biodegradability of biodegradable plastics can also be determined using ASTM D6868 and European EN 13432.

Again, the substrate for the food service item is biodegradable and generally formed from cellulosic fibers. Typically, the cellulosic fibers will make up from about 60 weight percent to about 99 weight percent of the substrate on a dry basis, and more preferably the cellulosic fibers will make up from about 75 weight percent to about 95 weight percent of the substrate.

In some instances, at least a portion of the cellulosic fibers are preferably derived from sugarcane, bagasse, wheatgrass, or recycled wood pulp.

In certain embodiments, the biodegradable substrate preferably also includes an amount of at least one biodegradable polymer. The biodegradable substrate, for instance, may include from about 25 to about 60 weight percent of the at least one biodegradable polymer.

More preferably, further additives may be incorporated into the substrate, along with the cellulosic fibers and the biodegradable polymer. For instance, in certain embodiments, the biodegradable substrate may include, in addition to cellulosic fibers, about 25 to about 60 weight percent of the at least one biodegradable polymer, from about 0.1 to about 2.0 weight percent of a surfactant (such as a wetting and dispersing agent), from about 0.1 to about 2.0 weight percent of a rheology modifier, optionally from about 0.1 to about 1.0 weight percent of a defoamer, optionally from about 1 to about 20% of a filler, and from about 0.001 to about 2.0 weight percent of a biocide dispersed (i.e. impregnated) within the substrate.

As used herein, a "rheology modifier" is a substance that changes the flow characteristics of the dispersion (i.e. thinning or thickening the dispersion). Examples of suitable rheology modifiers may be selected from the group consisting of polysaccharides (such as starches, glucan, xanthum gum, guar gum, and seaweed extracts), viscosity depressants (such as the VISCOBYK family or blends containing carboxylic acid esters and wetting and dispersing components), and viscosity enhancers (such solutions of modified polyurethanes including the BYK 400 family or derivatives of copolymers of ethyl acrylate and methacrylic acid such as ALCOGUM).

As used herein, a "filler" is an organic or inorganic material that provides multiple functions in dispersions. First, these materials increase the solid content of the dispersion. Second, fillers may alter the brightness and gloss of the formed film. Finally, fillers may additionally serve as thickeners. Examples of suitable fillers may be selected from the group consisting of clay, calcium carbonate, nanocellulose, kaolinite, montmorillonite, bentonite, silica, chitin, nano clay talc, mica, bentonite, titanium dioxide, and mixtures thereof.

As used herein, a "defoamer" is a material added to a mixture to reduce or eliminate the generation of foam during the coating or spraying process. Typically, the defoamer will be a silicone and/or mineral free material. Examples of suitable defoamer may be selected from the group consisting of polyether siloxanes (such as AIRASE 5355 or 5655 or TEGO FOAMEX 825, 902, or 1488), polyamide particles (such as BYK 1640 or BYK 016), and mixtures thereof.

As used herein, "surfactants" are added to dispersions to stabilize the polymer in the aqueous medium. Surfactants typically consist of both hydrophobic and hydrophilic regions. In a dispersion, these distinct regions orient themselves at the interface of the polymer particles and aqueous medium, lowering the surface energy between the boundaries of the two phases to promote dispersion.

As used herein, "wetting and dispersing agents" are a preferred type of surfactants that contribute to stabilization of the polymer and homogeneity of the dispersion. These materials typically contain bulky groups that keep the suspended particles separated through steric hindrance, which help prevent flocculation and settling of the particles. Wetting and dispersing agents also ensure the particles are fully wet by the aqueous medium, promoting full, homogeneous dispersion. Examples of suitable wetting and dispersing agents include, but are not limited to, BYK 190, BYK 192, BYK 193, BYK 184, TEGO 755, or TEGO 761, which are believed to be non-ionic or slightly anionic copolymers.

As used herein, a "biocide" is a material that kills organisms and thus protects the materials from microorganism growth and adhesion. Suitable biocide for inclusion according to the present disclosure include etylenediaminetetraacetic acid (EDTA) and benzisothiazolin.

As noted above, the food service item also includes a coating applied over the at least one food contact surface of the substrate. Optionally, other non-food contacting surfaces of the substrate may be coated as well. This coating is typically up of from about 25 to about 60 weight percent of at least one biodegradable polymer, and more preferably from about 40 to about 55 weight percent of at least one biodegradable polymer. In another embodiment, the coating may be from about 35 to about 50 weight percent of at least one biodegradable polymer.

In general, the at least one biodegradable polymer in the coating is preferably selected from the group consisting of polyhydroxyalkanoates, polylactic acid, polycaprolactone, polybutylene succinate, polybutylene succinate adipate, polybutylene adipate terephthalate, and mixtures thereof.

More preferably, the at least one biodegradable polymer preferably includes polyhydroxyalkanoates. A particularly preferred polyhydroxyalkanoate for use in the coating is poly-3-hydroxybutyrate-co-3-hydroxyhexanoate or P(3HBco-3HHx). In certain embodiments, P(3HB-co-3HHx) may be the primary or only polyhydroxyalkanoate in the dispersion.

The aforementioned P(3HB-co-3HHx) is in turn a copolymer made up of both hydroxybutyrate and hydroxyhexanoate and the relative amounts of the two components may vary somewhat. In general, however, it is preferred that the P(3HB-co-3HHx) be made up of from about 75 to about 99 mole percent hydroxybutyrate and from about 1 to about 25 mole percent hydroxyhexanoate. More preferably, the P(3HB-co-3HHx) is made up of from about 85 to about 95 mole percent hydroxybutyrate and from about 5 to about 15 mole percent hydroxyhexanoate.

In accordance with certain embodiments of the present disclosure, the polyhydroxyalkanoates more preferably have a weight average molecular weight from about 50,000 to about 2.5 million Daltons.

In general, some biodegradable polymers are preferred for including in both the coating and in the substrate, as discussed above.

In certain embodiments of the present disclosure, the coating is preferably applied over the at least one food contact surface at a coat weight, on a dry basis, from about 5 to about 50 grams per square meter.

The food services items thus provided according to the present disclosure exhibit excellent resistance to water and grease absorption—generally comparable to substrates items coated with non-biodegradable polymers such as polyethylene (PE), polypropylene (PP), or polyethylene terephthalate (PET). At the same time, the coated substrate remains biodegradable.

In particular, according to some embodiments, the coating preferably exhibits a Cobb water absorption value, measured according to TAPPI Standard T441, of less than 25 grams per square meter. Further, in certain embodiments, the coating preferably exhibits a Kit Test grease resistance value, measured according to TAPPI Standard T559 cm-12, of greater than Kit Value 5.

In a second aspect, the present disclosure provides a method for making a biodegradable food service item. In general, the method includes a step of providing a biodegradable aqueous dispersion. The method also includes a step of forming a layer of an aqueous slurry over a mold. The aqueous slurry is then molded, using a combination of heat and pressure, so that the heat and pressure from molding dries the slurry to form a biodegradable substrate.

An amount of the biodegradable aqueous dispersion is also applied over the substrate to form a layer of the dispersion. This dispersion layer is cured so as to form a film coating over the first surface of the biodegradable substrate.

A variety of methods may be used to cure the dispersion and form the film coating layer. For instance, the substrate—with the applied dispersion layer—may be placed back into a mold and subjected to further heat and pressure. The heat and pressure of the mold may be used to cure the dispersion and at the same time further dry the substrate.

In other instances, the substrate—with the applied dispersion layer—may be placed in a heated tunnel or oven for a period of time so that the hot air in the tunnel or oven cures the dispersion. In still other instances, the dispersion layer may be subjected to direct infrared or other radiation in order to cure.

The aforementioned biodegradable aqueous dispersion includes at least water and at least one biodegradable polymer. Preferably, the dispersion may also include further additives, such as a surfactant, a rheology modifier, defoamer, filler, and/or a biocide. In one preferred embodiment, the aqueous dispersion which may include from about 40 weight percent to about 75 weight percent of at least one biodegradable polymer, from about 0.1 to about 2.0 weight percent of a surfactant, from about 0.1 to about 2.0 weight percent of a rheology modifier, and from about 0.001 to about 2.0 weight percent of at least one biocide.

As discussed above, the at least one biodegradable polymer is preferably selected from the group consisting of polyhydroxyalkanoates, polylactic acid, polycaprolactone, polybutylene succinate, polybutylene succinate adipate, polybutylene adipate terephthalate, and mixtures thereof. More preferably, the biodegradable polymer includes one or more polyhydroxyalkanoates, such as poly-3-hydroxybutyrate-co-3-hydroxyhexanoate or P(3HB-co-3HHx).

According to the present disclosure, the dispersion may be prepared using various conventional mixing technologies. Preferably, the dispersion is mixed using high or low shear mixers and/or ultrasonic mixers.

According to the present disclosure, a layer of an aqueous slurry is formed over a mold. The aqueous slurry includes water and from about 10 to about 70 weight percent (preferably from about 10 to about 60 weight percent) cellulosic fibers. In some instances, the cellulosic fibers in the slurry may include fibers derived from sugarcane, bagasse, wheatgrass, or recycled wood pulp.

In certain embodiments, the slurry may also include an amount of the aforementioned aqueous dispersion. Thus, the slurry may include an amount of the biodegradable polymer and well as other additives included in the dispersion, such as a surfactant, a rheology modifier, defoamer, filler, and/or a biocide. In some instances, the aqueous slurry may include from about 10 to about 70 weight percent of the biodegradable aqueous dispersion. Overall, the aqueous slurry preferably has a solids content from about 10 to about 85 weight percent when initially formed over the mold.

Once the slurry layer is formed, the mold is closed and the slurry is then molded, using a combination of heat and pressure. In some instances, the slurry is preferably molded at a temperature from about 85° C. to about 170° C. and a pressure from about 100 psi to about 1500 psi. In other preferred embodiments, the pressure is from about 1000 psi to about 100,000 psi. As this heat and pressure are applied during the molding, the slurry at least partially dries to form a biodegradable substrate. After molding and associated drying is completed, the mold is opened and the substrate is removed.

Once the substrate is formed and at least partially dried, a layer of the biodegradable aqueous dispersion is then applied over the substrate. While the dispersion may be applied over the slurry in various ways according to the present disclosure, it is most preferably spray coated over at least one surface of the molded substrate. Preferably, the aqueous dispersion has a solids content from about 25 to about 60 weight percent, more preferably from about 25 to about 55 weight percent, when initially sprayed or otherwise applied over the substrate.

The aqueous dispersion is then cured and dried to form a film coating over the first surface of the biodegradable substrate. In this way, the finished food service item is formed. In some instances, the fully cured coating may be made up of from about 80 to 99.9 weight of at least one biodegradable polymer.

As discussed above, the food services items thus provided exhibit excellent resistance to water and grease absorption—generally comparable to food service items which have been coated with non-biodegradable polymers such as polyethylene (PE), polypropylene (PP), or polyethylene terephthalate (PET). Yet, the coated food service items of the present disclosure remain biodegradable.

EXAMPLES

The following non-limiting examples illustrate various additional aspects of the invention. Unless otherwise indicated, temperatures are in degrees Celsius and percentages are by weight based on the dry weight of the formulation.

Examples 1-11: Preparation of Aqueous Dispersions

Example 1

In this example, an aqueous dispersion was prepared for spraying the cellulosic molded articles. 25-45% of PHA (6.7 mol % polyhydroxyhexanoate; $M_w$: 450,000 g/mol) was placed in 40-60% of water with 1-4% of Tween and sheared at 1100 RPM for 90 minutes. After shearing, the mixture was subjected to ultrasonic mixing for 3 minutes. 0.1 to 1.0% of xanthan gum were then added to the resulting white dispersion and further sheared at 400 RPM for 30 minutes. Finally, 0.01 to 0.5% of Biocide was added to the dispersion.

Example 2

A dispersion was prepared as given in Example 1. 0.1 to 1.5% of a dispersing agent (DISPERBYK family) and 0.01 to 1.0% of a rheology modifier (BYK 400 family) was then added to this dispersion and sheared to ensure homogenous mixing.

Example 3

A dispersion was prepared as given in Example 2, and 2.0 to 8% of clay (Imersys Talc) was then added and sheared to a homogenous dispersion.

Example 4

In this example, 35.0 to 50% of PHA (6.7 mol % polyhydroxyhexanoate; 357,000 g/mol) was placed in 40-65% of water with 0.5 to 2.0% of Tween sheared at 1100 RPM for 90 min. After shearing, the mixture was subjected to ultrasonic mixing for 3 minutes. 0.01 to 1.5% of xanthan gum were added to the resulting white dispersion and further sheared at 400 RPM for 30 minutes. Finally, 0.01 to 0.75% of Biocide was added to the dispersion.

Example 5

A dispersion was prepared as given in Example 4. 0.5 to 2.5% of a dispersing agent (DISPERBYK family) and 0.01 to 1.0% of a rheology modifier (BYK 400 family) was then added to this dispersion and sheared to ensure homogenous mixing.

Example 6

A dispersion was prepared as given in Example 5, and 5-15% of Kaolin clay was then added and sheared to a homogenous dispersion.

Example 7

In this example, 25-45% of PHA (6.0 mol % polyhydroxyhexanoate; $M_w$: 545,000 g/mol) was placed in 40-60% of water with 1-4.0% of Tween and sheared at 1100 RPM for 90 minutes. After shearing, the mixture was subjected to ultrasonic mixing for 7 minutes. 0.01 to 1.0% of xanthan gum was added to the resulting white dispersion and further sheared at 400 RPM for 30 minutes. Finally, 0.01 to 0.75% of Biocide was added to the dispersion.

Example 8

A dispersion was prepared as given in Example 7, and 5-15% of Kaolin clay was then added and sheared to a homogenous dispersion.

Example 9

In this example, 20-40% of PHA (9.3 mol % polyhydroxyhexanoate; 1,458,000 g/mol) was placed in 50-75% of water with 1.0-5.0% of Tween and 1.0 to 3.0% Triton 100 and sheared at 900 RPM for 130 minutes. After shearing, the mixture was subjected to ultrasonic mixing for 20 minutes. 0.01 to 0.75% of xanthan gum was added to the resulting white dispersion and further sheared at 400 RPM for 30 minutes. Finally, 0.01 to 0.75% of Biocide was added to the dispersion.

Example 10

A dispersion was prepared as given in Example 9, and 0.1 to 1.5% of a dispersing agent (DISPERBYK family) was then added and sheared to ensure homogenous mixing.

Example 11

A dispersion was prepared as given in Example 10, and 1.0 to 10.0% of PHA (28.3 mol % polyhydroxyhexanoate) was then added and sheared to a homogenous dispersion.

Example 12

In this example, 45.0 g of PHA (6.7 mol % hydroxyhexanoate; $M_w$: 492,000 g/mol) was placed in 53 g of water with 1.5 g of Tego 755 sheared at 10,000 RPM for 5 min. After shearing, the mixture was subjected to ultrasonic mixing for 3 minutes. 0.25 g of Alcogum were added to the resulting white dispersion and further sheared at 7000 RPM for 5 minutes. Finally, 0.3 percent of a defoamer and 0.1% of Biocide was added to the dispersion.

Example 13

A dispersion was prepared as given in Example 12. 1 mL of a dispersing agent (Tego 761) and 0.1 mL of a rheology modifier (Alcogum) was then added to this dispersion and sheared to ensure homogenous mixing.

Example 14

A dispersion was prepared as given in Example 14, and 10 g of Kaolin clay was then added and sheared to a homogenous dispersion.

Example 15

In this example, 30.0 g of PHA (9.3 mol % hydroxyhexanoate; $M_w$: 1,458,000 g/mol) was placed in 65 g of water with 3.0 g of Tween 20 and 2.0 mL Triton 100 and sheared at 900 RPM for 130 minutes. After shearing, the mixture was subjected to ultrasonic mixing for 20 minutes. 0.05 g of xanthan gum was added to the resulting white dispersion and further sheared at 400 RPM for 30 minutes. Finally, 0.1% of Biocide was added to the dispersion.

Example 16

A dispersion was prepared as given in Example 15, and 0.75 mL of a dispersing agent (Tego 755) was then added and sheared to ensure homogenous mixing.

Example 17

A dispersion was prepared as given in Example 16, and 5.0 g of PHA (28.3 mol % hydroxyhexanoate) was then added and sheared to a homogenous dispersion.

Example 18

In this example, 55.0 g of PHA (6.7 mol % hydroxyhexanoate; $M_w$: 357,000 g/mol) was placed in 53 g of water with 2.5 g Tego 755 and sheared at 10,000 RPM for 10 minutes. After shearing, the mixture was subjected to ultrasonic mixing for 5 minutes. 0.1 g of xanthan gum and 0.25 g of Alcogum were then added to the resulting white dispersion and further sheared at 4000 RPM for 3 minutes. Finally, 0.2% of a defoamer and 0.1% of Biocide was added to the dispersion.

Example 19

A dispersion was prepared as given in Example 18, and 0.75 mL of a dispersing agent (Tego 761) and 1.0 mL of a rheology modifier starch were then added and sheared to ensure homogenous mixing.

Examples 20-21: Preparation and Testing of Coated Substrates

Example 20

The aqueous dispersion from Examples 1, 4, 7, 10, 13, 14, 16, and 17 were each coated onto a molded fiber tray using various spray techniques. The coatings were cured at 170° C. in a forced air oven and were applied to 5-25 grams per square meter (gsm) dry coat weight. The resulting Cobb water absorption values for each of these dispersions were less than 30 gsm, with Kit grease resistance values greater than 5 and canola oil had a no stain after 30 minutes.

Example 21

The aqueous dispersion from Examples 2, 5, 9, 12, 15, and 18 were each coated onto a molded fiber tray using various spray techniques. The coatings were cured at 170° C. in a forced air oven and were applied to 10-25 grams per square meter (gsm) dry coat weight. The resulting Cobb water absorption values for each of these dispersions were less than 30 gsm, with Kit grease resistance values greater than 5 and canola oil did not stain after 30 minutes.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A biodegradable food service item comprising:
    a biodegradable substrate having at least one food contact surface, wherein the substrate comprises from about 75 weight percent to about 95 weight percent cellulosic fibers on a dry basis; and
    a coating applied over the at least one food contact surface,
    wherein the biodegradable substrate is formed from an aqueous slurry comprising cellulosic fibers and from about 10 to about 70 weight percent of a biodegradable aqueous dispersion,
    wherein the biodegradable aqueous dispersion comprises from about 25 to about 60 weight percent of polyhydroxyalkanoates, and
    wherein the coating also consists of the biodegradable aqueous dispersion.

2. The biodegradable food service item of claim 1, wherein the polyhydroxyalkanoates have a weight average molecular weight from about 50,000 to about 2.5 million Daltons.

3. The biodegradable food service item of claim 1, wherein the biodegradable substrate comprises a biodegradable plate, cup, bowl, takeout container, straw, or eating utensil.

4. The biodegradable food service item of claim 1, wherein the biodegradable aqueous dispersion further comprises from about 0.1 to about 2.0 weight percent of a surfactant, from about 0.1 to about 2.0 weight percent of a rheology modifier, optionally from about 0.1 to about 1.0 weight percent defoamer, optionally from about 1 to about 20% of a filler, and from about 0.001 to about 2.0 weight percent of a biocide, wherein all weight percentages are on a wet basis.

5. The biodegradable food service item of claim 1, wherein at least a portion of the cellulosic fibers are derived from sugarcane, bagasse, wheatgrass, or recycled wood pulp.

6. The biodegradable food service item of claim 1, wherein the coating is applied over the at least one food contact surface at a coat weight, on a dry basis, from about 5 to about 50 grams per square meter.

7. The biodegradable food service item of claim 1, wherein the coating exhibits a Cobb water absorption value, measured according to TAPPI Standard T441, of less than 25 grams per square meter.

8. The biodegradable food service item of claim 1, wherein the coating exhibits Kit Test grease resistance value, measured according to TAPPI Standard T559 cm-12, of greater than Kit Value 5.

9. A method for making a biodegradable food service item, the method comprising the steps of:
    providing a biodegradable aqueous dispersion which comprises water and from about 25 weight percent to about 60 weight percent of polyhydroxyalkanoates;
    forming a layer of an aqueous slurry over a mold, wherein the aqueous slurry comprises cellulosic fibers and from about 10 to about 70 weight percent of a biodegradable aqueous dispersion;

molding the aqueous slurry, using a combination of heat and pressure, wherein the heat and pressure from the molding step at least partially dries the slurry to form a biodegradable substrate having at least one food contact surface which comprises from about 75 weight percent to about 95 weight percent cellulosic fibers on a dry basis;

applying an amount of the biodegradable aqueous dispersion over the substrate to form a layer of the dispersion over the at least one food contact surface of the substrate; and curing the dispersion layer so as to form a coating which also consists of the biodegradable aqueous dispersion on the at least one food contact surface of the biodegradable substrate.

10. The method of claim 9, wherein the aqueous dispersion is spray coated over at least one surface of the molded slurry layer.

11. The method of claim 9, wherein the slurry is molded at a temperature from about 85° C. to about 170° C. and a pressure from about 1000 psi to about 100,000 psi.

12. The method of claim 9, wherein the slurry has a solids content from about 10 to about 85 weight percent when initially formed over the mold.

13. The method of claim 9, wherein the aqueous dispersion has a solids content from about 25 to about 60 weight percent when applied over the slurry layer.

14. The method of claim 9, wherein the polyhydroxyalkanoates have a weight average molecular weight from about 50,000 to about 2.5 million Daltons.

* * * * *